United States Patent
Terziakin (10) Patent No.: US 7,285,761 B1
(45) Date of Patent: Oct. 23, 2007

(54) HOT FORMING SYSTEM FOR METAL WORKPIECES

(76) Inventor: Mehmet Terziakin, Incirli Cad. Gulbahce Sok. 13/1 Bakirkoy, Istanbul (TR) 34740

( * ) Notice: Subject to any disclaimer, the term of this patent is extended or adjusted under 35 U.S.C. 154(b) by 0 days.

(21) Appl. No.: 11/087,766

(22) Filed: Mar. 24, 2005

(51) Int. Cl.
*H05B 6/10* (2006.01)
*B23K 13/01* (2006.01)

(52) U.S. Cl. .................................. 219/633; 219/603

(58) Field of Classification Search ............... 219/633, 219/603, 765, 618
See application file for complete search history.

(56) References Cited

U.S. PATENT DOCUMENTS

| | | | |
|---|---|---|---|
| 4,350,861 A * | 9/1982 | Pouillange et al. ......... | 219/645 |
| 4,761,527 A * | 8/1988 | Mohr .......................... | 210/645 |
| 4,856,311 A * | 8/1989 | Conaway ..................... | 72/56 |
| 4,942,750 A * | 7/1990 | Conaway ..................... | 72/56 |
| 6,919,545 B2 * | 7/2005 | Chen ........................... | 219/672 |
| 6,919,547 B2 * | 7/2005 | Tsontzidis et al. .......... | 219/730 |
| 6,927,370 B2 * | 8/2005 | McClure et al. ............ | 219/603 |
| 6,960,746 B2 * | 11/2005 | Chen ........................... | 219/659 |

* cited by examiner

*Primary Examiner*—Daniel Robinson
(74) *Attorney, Agent, or Firm*—Venable, Campillo, Logan & Meaney PC (57) ABSTRACT

A device including at least one transformer with primer/seconder coil ratio more than one and including a control unit used to control timing and magnetute of the primer current is employed to heat a metal workpiece to be subjected a subsequent forming operation. An homopolar DC generator can also be used as current source for current heating preparing workpiece for forming operation. Subsequent heating, forming and cooling processes of the metal workpiece are carried out in a controlled manner by a central synchronization unit. This process can be applicated in hot metal bulk forging, sheet forming and hot tube blowforming.

15 Claims, 6 Drawing Sheets

HOT FORMING SYSTEM FOR METAL WORKPIECES

TECHNICAL AREA

The invention relates with an electrical system that includes at least one transformer with primary/secondary coil ratio more than one and a control unit that controls electrical current at the primary circuit; that closes the electrical circuit by passing the electric current generated at the secondary coil through the metal workpiece and preparing the workpiece by heating prior or simultaneous to the forming operation.

BACKGROUND OF THE INVENTION

Heating of metal workpieces prior to forming operations such as hot forging, rolling, extrusion etc. is a significant part of the process. Heating of the workpiece is usually performed in a furnace and subsequently, the workpiece is placed in the forming machine. This is a series of independent operations in the sequence of heating, handling and forming. There are a few patents granted and technologies developed on combined heating and forming. In Weldon and Jains invention (U.S. Pat. No. 5,515,705) the lower and upper dies forging the billet in between are used as electrodes supplying electric current. This invention has some technical difficulties and limitations of practical implementation due to relatively small contact are between workpiece and dies, electrical arcs formed by sharp features of the dies and workpiece, localized overheating and uncontrollable deformation or melting on the workpiece. In another patent in which heating by electrical resistance and forming are combined (Yasui, U.S. Pat. No. 5,737,954) the sheet metal workpiece are formed at superplastic conditions and welded to each other using diffusion welding. The applicant of this patent also holds a patent (Terziakin, U.S. Pat. No. 6,463,779) on this technology. In the proposed apparatus, the electrical heating is conducted inside the press table and thus the dies need to be designed accordingly. The press ram is stopped for a few seconds while the sheet metal part is being heated via conditioned electric current and the forming process is performed immediately after the heating is complete. Therefore, the electrodes need to be isolated from the dies and the workpiece must not touch the dies during when the electric charge is on.

SUMMARY OF THE INVENTION

This invention shall provide a system including at least one transformer serving to improve formability of metal workpieces and to increase strength rates of formed parts. It will enable to heat metal workpieces in combination with forming process and controlled cooling process after forming. Additionally generation of the heat in the workpiece and the short duration of heating, forming and cooling (treatment) help reduction or elimination of scale, while significant changes in microstructure will not occur. On the other hand, under proper conditions it is capable to harden metal workpieces during or after the forming process to obtain higher mechanical strength such as martenzitic steel or hardened aluminum alloys. The system will direct the line energy through at least one transformer with a primary/secondary coil ratio more than 1 and that reduces electric voltage and increases electric current. The electric current amplified at the secondary coil is directed over the metal workpiece and the required process temperature at which the material formability is highest is obtained. This electrical system will work at a timing tuned to work subsequently in coordination with the mechanical forming process. Being coupled with the metal forming system, this system will provide effective automation of the whole process. Another high current rate source is to use a homopolar generator. This DC generator type has also capable to generate such high current rates. Homopolar DC generator can also be used as current source instead of transformer. In this case timing of current feeding heating the workpiece is controlled by opening or closing connection between metal workpiece and DC generator. This timing and magnetute control of current generated by DC generator must also be made in synchronization with other mechanical forming operations as a general rule. Any figure an arragement including DC generator about the invention has not been added because of it is a well known and basic technology. If DC generator is used as a current source the invention also includes the possibility of the system to be mounted on the material handling system. This way the part is heated during transport from stock pile or between subsequent operations and thus the need for a furnace is eliminated. As it is known forming of metals at elevated temperatures can be realized as warm or hot forming depending on recrystalisation temperature of each metalic material. Hereby hot forming expression is generally used for forming process at elevated temperatures at these documents.

In this invention whole system has ability to keep its own temperature between a predetermined range. A cooling system (or several systems) is employed to keep cool whole system sufficiently in spite of significant and unpredictable heat input occuring during continuous operation. Some complementary operations can be applicated during hot stamping operation. Elevated temperature of the workpiece simplifies operations such as blanking, punching etc. Suitable apparatus for such operations can be added to the dies. The process can also offers an effective way to increase strength rate of the hot formed parts with die queching for proper materials and process chareteristics.

BRIEF DESCRIPTION OF THE DRAWINGS

The invention is explained in detail below with reference to the exemplary embodiments and with reference to the accompanying drawings, in which:

FIG. 5 illustrates integration of heating during material handling, forming and rapid cooling to form hardened workpiece. FIG. 5 also illustrates integration of the electrical heating system to a material hardening apparatus that works in a multiple step or progressive forming process at elevated temperature.

Finally.

DETAILED DESCRIPTION OF THE DRAWINGS

Figure 1:
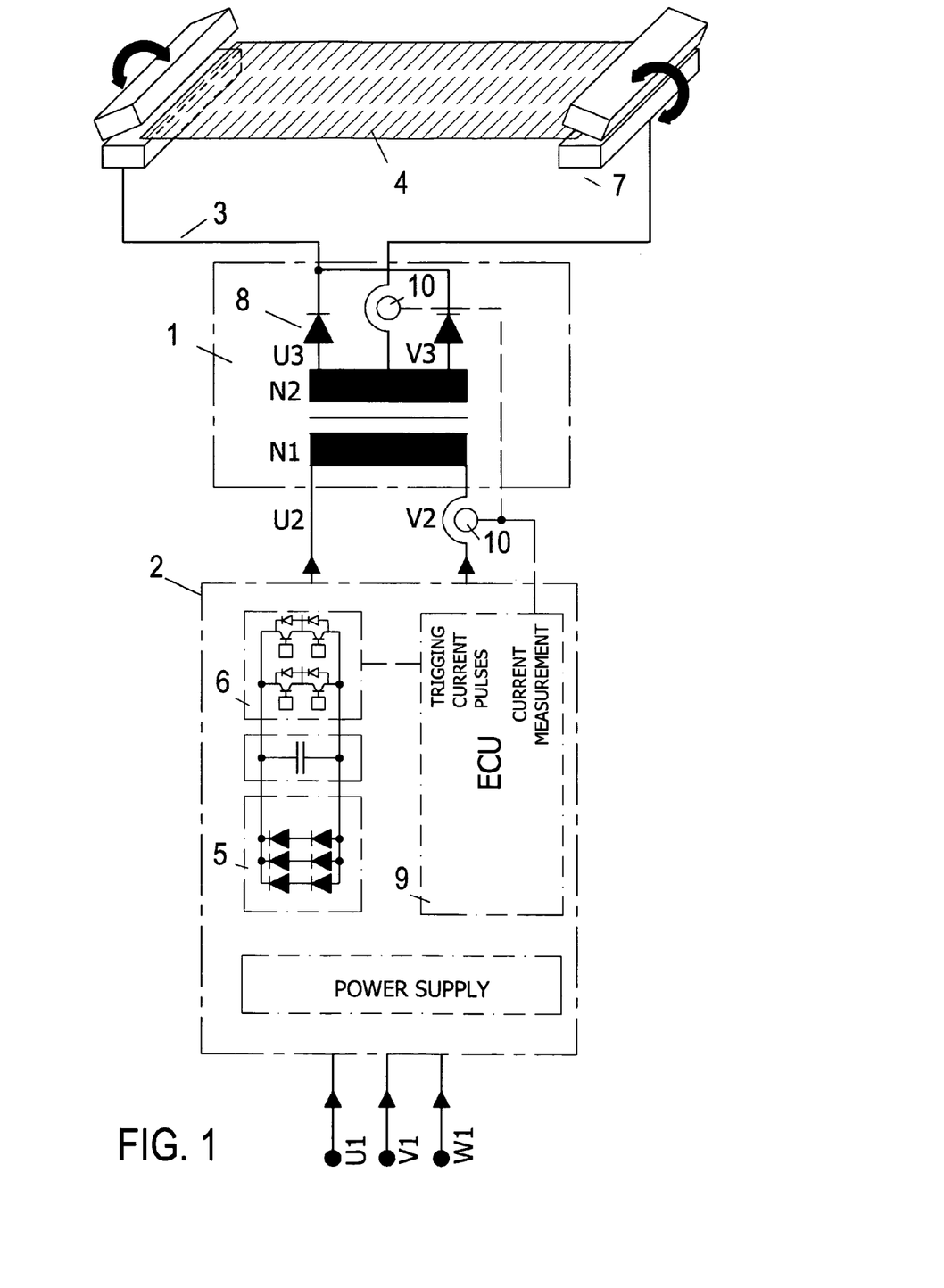
FIG. 1 is schematic view of the electrical circuit of the stepped system using three phases and providing high current rate for the process.

As illustrated in FIG. 1 the current control in this system is achieved at the primary coil where the current value is less. An electronic circuit 2 (ECU) with thrystor or switching device etc. will command at the input of the primary circuit. Devices to protect against electrical overcharge such as thermal switches must also be place at the primary circuit. The magnitude of the current at the secondary circuit must be high in this system; therefore, the contact resistance between metals completing the circuit significant. All the connections including all the conductors completing the secondary circuit 3 except the one between electrodes 7 and the workpiece 4 can be made using soldering or copper brazing to minimize resistance.

In FIG. 1 illustrated system consists of three essential devices. These are transformer group with auxiliaries 1, current control device 2 and last circuit consisting of connections 3 between second coil of the transformer, electrode sets 7 contacting with the workpiece and the workpiece 4 itself. Workpiece 4 is replaced in each production cycle and all other parts of the system is cooled during production and temperature rates of the parts are kept within their predetermined temperature ranges.

As shown in FIG. 1 to be able to use the process on larger workpieces 4 systems that use the three phases U1,V1,WL of the mains energy are employed loading the phases equally. Especially in industrial scale applications the system will demand high electric power rates. At first stage current control system 2 is charged by three phases (U1,V1, W1) of the means. This three phases AC is converted into DC by 6-pulse bridge rectifier arrangement 5. At the second stage this DC is converted into AC (U2,V2) current with higher frequency than that of the means (50 or 60 Hz) by employing transistorized frequency inverter 6. Higher frequency simplifies function of the last step transformer 1 by means of increasing induction rate inside the core of the transformer. In this case smaller scale transformers will be sufficient for high power rates. Intensity of the current is controlled by adjusting the pulse width at the frequency inverter 6. These pulses are triggered by electronic control unit 9 depending on desired current rate. One or more current measurement transformers 10 situated primary or secondary circuit of the transformer 1 measures actual current rate and determinates deviation between desired and actual current rates. Thus ECU 9 determinates proper pulse width for transformer 1 feeding and adjust current flow by employing triger circuit and thristor set 6.

This two phases AC (U2,V2) provided by current control unit 2 is connected to transformer unit 1. Primary coil (N1)/secondary (N2) coil ratio of this transformer is more than one. Voltage of this AC (U2,V2) charge is reduced and current rate is also significantly increased at the second coil of the transformer (U3,V3). In some cases a group of parallel or series connected transformers can also be employed instead of one transformer. In some industrial applications required current rate may be too much for a single transformer.

As it is known altenative current causes higher impedance in a circuit loop 3,4 in high current rates. As current rate increases empedance rate of the last circuit 3,4 also increases and becomes an obstacle for providing desired high current rates. Because of this reason in order to reduce empedance of the last circuit consisting of the workpiece 4, connections 3, electrodes 7 etc, AC inducted at the second coil of the transformer should be converted into DC at the exit of the transformer by being rectified by diods 8. A cooling system is employed to keep temperature rates of these devices within their acceptable ranges and to prevent damages of heat accumulation. A coolant fluid is passed through coolant passages of these devices. It is also possible to arrange other different alternatives for controlling current flow of the system.

For small workpieces, a simpler arragement can be employed. In this system, two of the three line phases are connected to the primary coil. The primary circuit current passes through these two phases of the line. A control unit is used to control primary current characteristics with thrystor, switching device etc. are included. Whole system including control unit with thrystors, transformer, connectors and electrode sets contacting with the workpiece is cooled by a suitable cooling system such as closed circuit fluid cooling. The control system coordinates the operations of the forming process and the magnitude and timing of the primary current simultaneously. As an option, the primary current may also be developed between phase and ground. Primary/secondary coil ratio of this transformer is also more than one and that reduces the voltage and increases the current of the received electrical power and feed current to the workpiece is order to generate heat. This system is fairly simple and it is not illustrated in figures.

Figure 2:
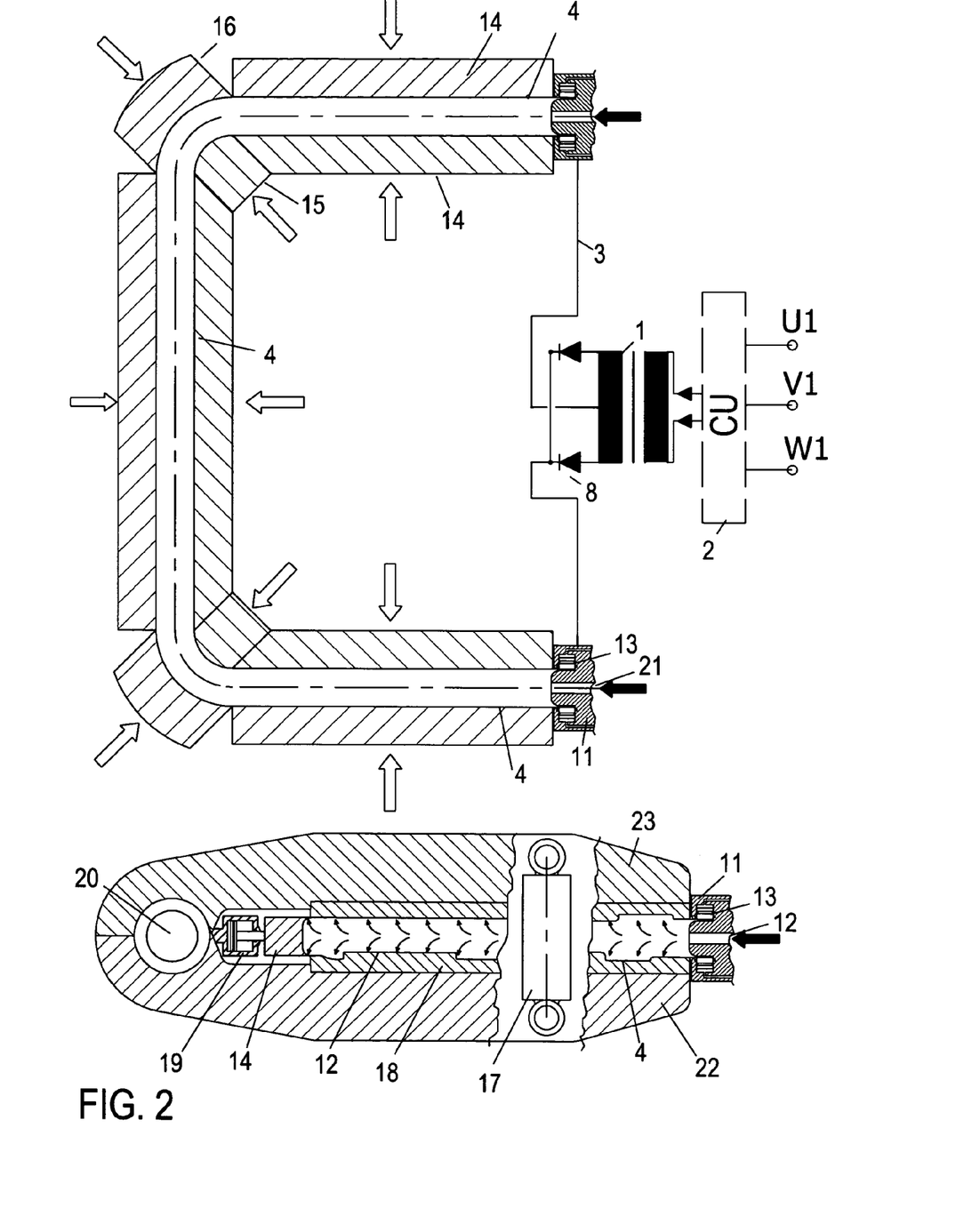
FIG. 2 shows application of the invention on hot tube hydroforming. In this process, a tube is heated by current application and formed by external dies while being internally pressurized by a fluid.

In FIG. 2, above electrical system is used to hot or warm hydroforming of tubular metal workpieces with closed sections. As it is being heated by current provided by above system, dies are used to compress and to form the tubular workpiece. The control system 2 illustrated with dashed lines (CU) controls the timing and current magnitude of the electrical heating system, in sequence with the mechanical forming operation(s). The control of the mechanical forming operations illustrated in several examples below is performed by this system through direct communication between the systems that control the hydraulic and/or pneumatic valves etc. For instance, the subsequent mechanical operations in tube hydroforming process performed using an internally pressurized fluid and both heating and forming procesess are performed under synchronization with this control device.

In this configuration, to reduce the contact resistance between the metal workpiece 4 and the electrode set 5, it is advisable to clean the contact surfaces of the workpiece contacting the electrodes. During rolling of coiled sheet metal or metal billets, bars etc. the material is lubricated using mill oil to reduce friction and corrosion. In addition, the outer skin of the metal consists of material with higher electrical resistance and lower surface properties due to oxidizing and other effects of air and forming operations. Depending on the material type, application of a chemical and/or mechanical cleaning/improvement process at the electrode contact area of the workpiece.

In the forming operation of an anti-corrosion coated metal at elevated temperature, the coating may be damaged due to high temperature. Particularly, the coating will peel of at electrogalvanized or galvannealled sheet steels. However, the flow stress will be reduced at elevated temperature and thus corrosion resistant steels with higher chromium content and no coating will be possible with the invention. This way, parts with both higher strength and corrosion resistance will be produced. Instead of lubricating the workpiece, the die components may be lubricated and/or the die components may be coated with heat resistant ceramic coatings or metal alloys.

In FIG. 2, forming of welded or seamless tube, pipe etc. with closed section 4 under internal pressure at elevated temperature using the proposed invention is illustrated.

Compared to the tubes formed using cold tube hydroforming, tubes made of higher strength and/or low formability metals will possibly be formed using the invention. In this system, an electrical device with a transformer that has a primary coil size larger than secondary coil size 1 and that reduced voltage whereas increases current as illustrated in FIG. 1. In this set-up, an electric control circuit 2 using thrystor(s) to synchronize the mechanical forming operations with the feeding of the current, adjusting its magnitude and thus heating of the workpiece 4. The workpiece 4 shown in FIG. 2, is a metal tube or pipe with closed profile. In the Figure, this part is initially subjected to a bending operation. Next, a process combining the electrical heating operation with internal fluid pressurizing and external forming operations using dies are conducted in a synchronized manner. The internal pressure may be applied using pressurized gas as well as some type of liquid, preferably an insulator.

In the forming process, the heating operation by feeding electric current 21 using the electrical system 1,2 described above, achievement of workpiece temperature control, pressurizing of the tube by liquid or gas pressure 12 and subsequent tube forming using dies are achieved. Both ends of the tube are closed by plugs 11 that function as the electrodes 21 as well as pressurized fluid feeders 21. These plugs are supported by pressurized hydraulic cylinders 13. After placing the plugs into the ends of the tube, the hydraulic cylinders are pumped with pressurized hydraulic fluid and thus these cylinders compress the plugs with the necessary force.

In this figure, the forming operation is designed to be conducted by two piece die set containing the upper 23 and lower dies 22 linked 20 and operated using a couple of hydraulic cylinders 17.

In principle, there are three basic parameters in tube forming using this process: The internal pressure 12, the workpiece temperature, which determines the forming properties of the material and which is controlled by the electrical current 21 fed and the displacements and pressures of the forming dies 14, 15, 16, 18 that surround the workpiece. The sequence and magnitudes of these three process parameters are to be designed appropriately for any given tube geometry and other properties. To obtain internal pressure, pressurized fluid 12 is pumped through the component number 11 Electric charge is fed by the electrodes 11 and the tube is heated to a temperature at which the formability is increased to a satisfactory level for the forming operation. Component number 11 is made of materials such as appropriate copper alloys with good conductivity and high strength completely or partially at the contact portion. To prevent bursting due to excessive internal pressure 12 and/or localized overheating by electric current 21 the surrounding forming die components 14, 15, 16, 18 must be closely located to the tube surface. The surrounding die components 14 approach and contact the tube. The die lower 22 and upper 23 die components approach each other in both directions being pushed by the hydraulic cylinders 17 in the mechanical linkage 20. Simultaneous to this operation the internal pressure and/or the current fed to the workpiece may be increased gradually. Consequently, the final/required geometry of the tube is formed by the internal fluid pressure and dies.

The laterally moving die components 14, where necessary, are guided by the slides mounted to the lower die 22 or 23 and powered by the hydraulic cylinders on the rear side 17, 19. These channels are not shown in the figure not to make the figure more complicated. All of the contacting surfaces (elements) of the die components are preferable made by ceramic inserts 18.

Based on the initial form and final geometry of the tube 15, 17, 16, the lateral die components may also be an option. If the previously bent tube fits in the die cavity supported by the lateral components 14, these components may be designed in fixed configuration and only the lower 22 and/or upper dies 23 will move 18 and form the tube. The tube material may be aluminum, magnesium or steel alloy as well as other more expensive or exotic metals.

In those steel alloys with Carbon equivalent of 0.35 or higher, after forming operation at hot forming temperature, rapid cooling using water, oil or air will lead to a martensitic microstructure and thus a higher mechanical strength. The invention proposes two different methods for this purpose. In the first one, the dies are retracted after the forming operation, and pressurized air or air-mist mixture is sprayed over the part and thus the tube is cooled immediately. In the other one, the pressurized fluid in the tube is drained immediately after the forming operation through the plugs 11, 12 and it is filled by a coolant fluid or an air-mist mixture is passed through the tube for rapid cooling. The details of this cooling system are not illustrated in the figures.

The parameters of the process described above, such as part material, size and geometry, internal pressure, forming temperature, and cooling method, are determined by carefully planned engineering experiments.

Figure 3:
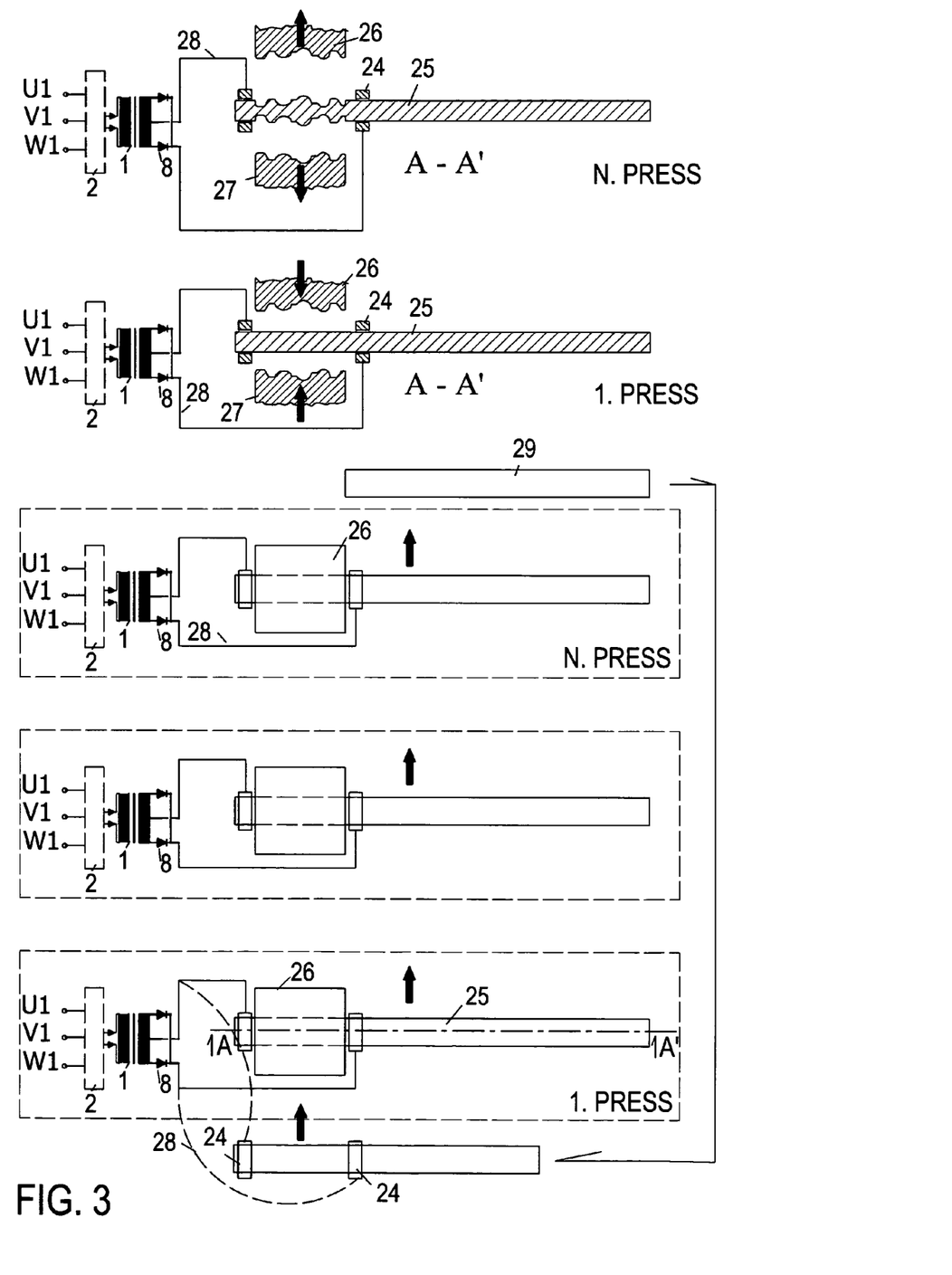
FIG. 3 illustrates the application where electrical heating system is used for bulk metal hot forging process that integrated to the material handling system.

Application of the invention in the hot or warm (billet) forming operation is illustrated in FIG. 3 This process is particularly advantageous for long workpieces with small cross section combining the rapid heating and forming operations. The workpiece in the form of a billet or bar 25 is charged with the electric current generated at secondary coil of the transformer (1) by two electrodes/clamps 28, 24 while being transferred into the forging dies on the conveyor. Thus, the workpiece gains the required temperature before the subsequent forming operation.

This type of process may be performed in multiple dies or a progressive die set 26, 27 in a sequence of operations (from 1. Press to N. Press) designed to start at the 1. th die or station and finish at the n. th die or station. The characteristic principle of the invention, the electrical heating system, is used in this set-up as the rapid initial heating and rapid intermediate heating between subsequent forming steps. Similar to the other applications, the thrystor type control device 2 connected to the primary coil of the transformer 1 controls the magnitude and timing of the electrical current adjusted according to the designed sequence of heating and forming operations. The contact areas of the electrodes 24 on the workpieces 25 should be subjected to a chemical and/or mechanical cleaning operation to reduce contact resistance. This cleaning operation may also be integrated to the system, if necessary. Heating the workpiece during transport; namely, movement of the workpiece along with the electrodes 24, will help reduce the total process time. In this configuration, the connectors 28 between the transformer 1 secondary coil and the electrodes 24 must be sufficiently long and flexible, and the clamp type electrodes 24 must hold the workpiece strongly and the conveyor system must be isolated from the electrode to prevent any shortcuts. The connectors have also a cooling system to dissipate heat preferable with fluid circulation or air blowing. The transport system moves the workpiece and the electrical heating system heats it up before next forming operation. This way, the forming of the previous and heating of the next workpieces will be performed simultaneously, and thus the heating time will not be added to the forming operation (cycle) time. In this system, to improve superior friction conditions, the die surfaces may be coated by appropriate ceramics.

This system is preferably used in a forming set-up that works with an automated conveyor system. In the figure, the heating and forming operations take place at one tip of the billet or bar, and rest of the billet/bar is fed into the die set for the next workpiece 29 after the formed portion is cut-off. Whole operation parameters of the process such as current heating, transporting and forming operations must be carried out synchroniously and should be controlled by a central control unit. Same hot or warm forming process can be applied in scew, rivet, nut, bolt etc production especially for relatively big size parts made of high strength metal alloys. Forming operation in these systems can be achieved as forging tapping, threat rolling, turning, bending etc. depending of parts to be producted.

Figure 4:
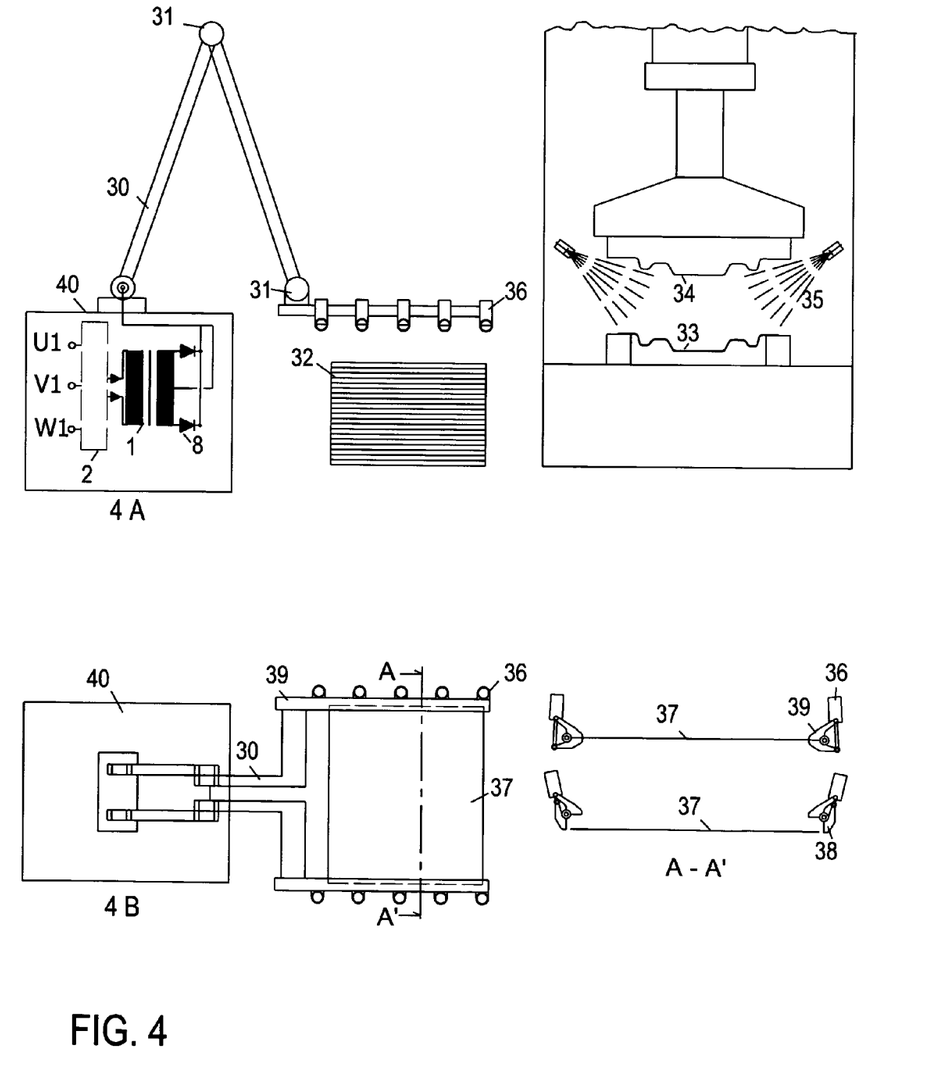
FIG. 4 combination of electrical heating, forming and hardening by air or spray cooling is illustrated.

As illustrated in FIG. 4, a set-up in which the electrical heating system is implemented in the handling robot 40 or material handling system. In this configuration blank sheet 37 is heated during handling while previous one 33 is being stamped. Whole system including current heating and hot or warm forming processes can be operated at same time, thus each production cycle takes less time. The electrodes 38, 39 that both hold and move the sheet metal workpiece 37 are clamps that have a long strip of contact surface for sufficient electrical conductivity. This contact surface 39 is made of the electrode material and the high conductivity cables and/or bars are connected to the secondary coil output terminals. High current rate is provided by second coil of transformer 1 as explained above. This electric transmission line is made of either flexible cables or rigid copper bars etc. linked with hinges 31. The electric conductors are fitted to carrier arms 30 of the system etc. and should also cooled by fluid circulation. The blank sheet is heated during transport from stock pile 32 or waiting for subsequent forming operation.

The lower and upper components 38, 39 of the clamp type electrodes are hinged to each other. The open-close function is performed by reciprocal motion of a hydraulic or preferably pneumatic cylinder 36. The lower 38, the upper 39 or both of the clamps may be used as the electrode. In the figure, it is difficult to use the moving lower clamp as the electrode; therefore, the stable one 39 is more suitable to be an electrode. In this set-up, while the clamps are opening in the downward direction and the sheet workpiece is lowered, they guide the part to prevent movement in the lateral direction and thus locate it on the right position on the die.

Figure 5:
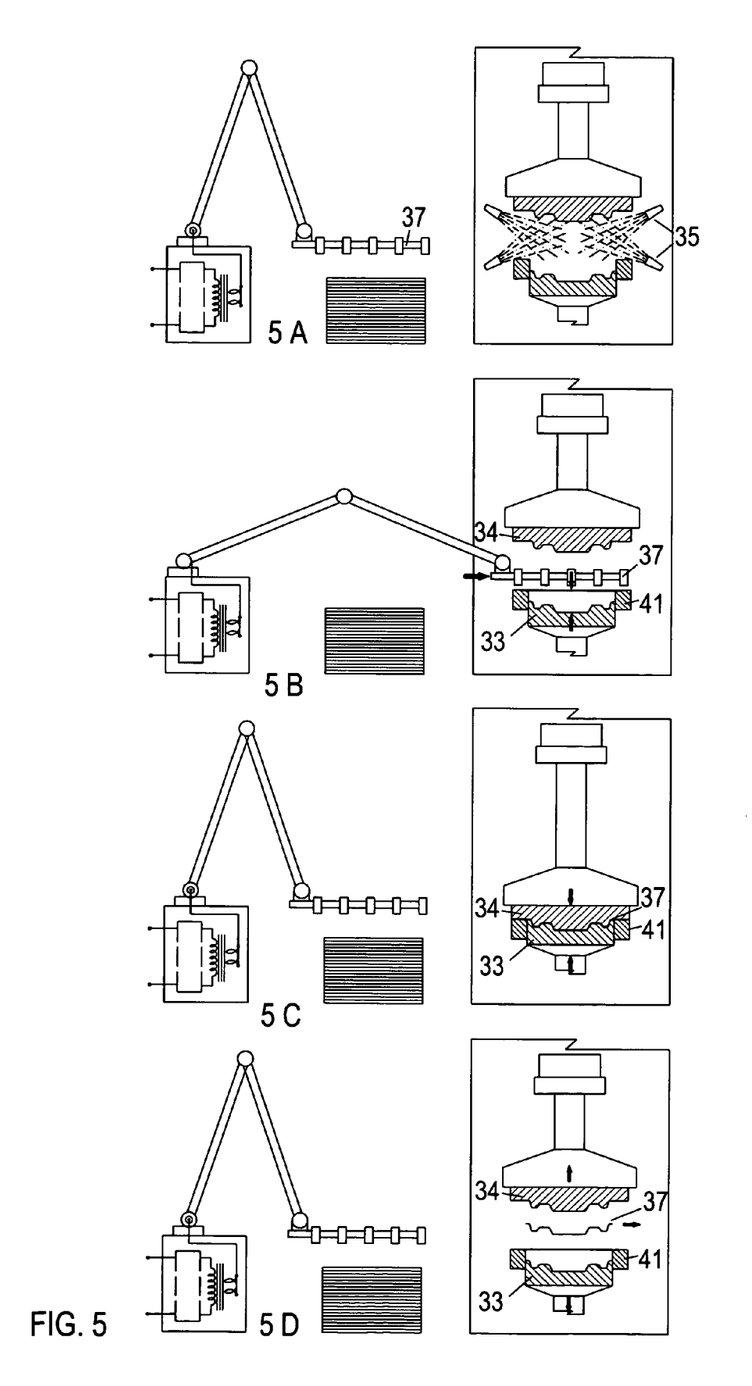

Heat transfer between hot workpiece 33 and the dies 34 influence hot forming process. However this influence generally beneficial and leads to increase in local strenght rates in some critical contact areas between dies and hot sheet. At these contact areas local stress rates intensify and such a local cooling can improve local strain rates by means of strength increase. Average temperature of the dies should be maintained between predetermined range because process should be repeteable and too low or too high temperatures distort hot forming characteristics and part dimensions. Another reason is that die materials may be damaged by overheating. In mass production in this system a suitable cooling means should be used such as blowers that could be placed around dies or a fluid circulation system including passages or pipes contacting dies. Temperatures of the dies are measured and near upper limit blowers or fluid circulation is employed to dissipate heat from dies. In FIG. 5 an example of such a system is shown. Blowers or water sprays 35 are placed around dies and used to dissipate heat. For example dies can be maintained between 100–150 C range. ECU, transformer, carrier and connector arms 30,31 and electrode sets are also cooled by a proper cooling means such as coolant fluid circulation. Thereby these components are hold within predetermined temperature ranges along mass production and overheating damages will be prevented.

On the other hand the invention also offers another important instrument to control such hot or warm stamping process. By contrast of cold forming, metals at the elevated temperatures has high strain rate sensivity feature. At low forming speeds alongation rates of the heated metal can be seriously increased. Since such an hot stamping system should be used for various materials, temperatures and several dies, each combination of those can require different forming speeds. There are several ways to make presses with adjustable speed. In this invention this feature can be used easily by employing speed control means with speed control such as frequence inverter (not shown in Figures) in electric feeding of electric motor of main hydraulic pump in hydraulic presses. Because of this current heating means can also be applicated during forming stage (if nonconductive dies are used) both temperature and forming speed can be controlled together. This speed control means with frequence inverter should also be controlled by central control unit controlling whole heating and forming parameters of the process.

As illustrated in FIG. 5, the system proposed in the invention is used in combination with the workpiece conveyor and basic process stages are shown in sequence in a double action hydraulic press. The metal workpiece (sheet, plate, billet, bar etc.) is heated during transport from storage or pallet to the forming die. Since the time interval between heating and forming operations is minimal heat loss particularly in workpieces with large surface areas as compared with their cross-sections such as sheets, plates, bars etc. and the possibility for process operation is much higher. The sheet forming operation in this system will be performed in a set-up similar to conventional systems. However, due to lower yield strength, higher ductility and strain rate sensitivity and the temperature gradient that may occur on the workpiece some process and die design modifications may be necessary. For example, a lower blank holder force may be used. Current heating is fed by main system of the invention as shown in FIG. 1

In this set-up, the workpiece 41, while being transported to the forming die set 45 on a press, is held by two clamp type electrodes at two ends and is heated within a few seconds by feeding the regulated low voltage electric current and is placed in the die set at the required forming temperature. The electric current is fed from the secondary coil of the transformer 1 by cables or conductors connected to the moving arms holding the clamps 41 to the workpiece. The moving arms 41 of the transport system may contain mechanical linkages 42. The motion of these linkages 42 may be obtained by conventional hydraulic or electrical (such as step or servo motor) systems. These linkages 41 are designed close to each other and as short as possible to keep the conductor lengths short, the electrical impedance of the electrical system low and thus electrical efficiency of the system high.

This invention can be applicated as many different configurations. One of these alternatives is to situate elecrode clips on a stable position near dies. Especially for relatively thich materials allowing handling operation while maintaining its temperature sufficiently until forming operation this configuration may be a easy to applicate and inexpensive alternative. Although it is not shown in a figure particularly, only difference between this configuration and that of seen in FIG. 5 is these clips 38, 39 connected to second coil of the transformer 1 will be positioned in stable places adjacent to forming tools. When the workpiece reachs sufficient temperature is then carried to forming position.

To reduce formation of scale due to high temperature, the workpiece can be coated with a protective layer such as a suitable metallic coating or heat resistant oils or ceramic coating etc.

The subsequent operations of this process performed in a double action hydraulic press, are illustrated in FIG. 5. In the first part (FIG. 5A), a sheet metal workpiece is taken and transported from a stack of sheets using vacuum cups, while at the same time dies 33, 34 are being cooled and cleaned by pressured air 35 or/and pulverized water blowing. Then proper lubricants can also be sprayed toward die surfaces. When the sheet is located at the holding position the two clamp type electrodes hold the sheet at two opposite sides and applicate the current to heat the material. As shown in FIG. 5B when the simultaneous forming operation is complete and the die set is empty and ready for the next cycle, the workpiece is ready at the required temperature and it is located on the blank holder 41 by releasing the clamps and the clamps are retracted. The first contact points of the sheet metal workpiece are designed as a bead such that a small pointwise or curvilinear contact area rather than a planar one is generated and thus heat loss from the workpiece is minimized. In FIG. 5C upper die 34 is moved down and rests blank holder 41 and thus hot sheet 37 is hold firmly and then stamped by upward action of lower die 33. Hot stamped sheet is then quenched by air blowing 35 or pulverized water spraying for being hardened. In 5 D formed and hardened part 37 is removed from die and next blank is prepared for next cycle.

If the operation is an intermediate step in a series of operations, the part is transferred to the next station with a similar heating set-up and forming die. If a hardened sheet metal part is required at the end of the process, an air or spray quenching operation is the final step as explained above. The spraying may take place right after a hot finish forming operation or it may be performed after heating up to recrytallization temperature. After the workpiece is taken of the die set, residual water droplets on the die components are eliminated manually or automatically by pressurized air. In this process, the die components are lubricated rather than the workpieces. This way the lubricant will contact the hot workpiece only during forming operation. However, the forming dies need to be cleaned and re-lubricated after a number of cycles to be determined by experience. Both the cleaning and relubrication may be performed manually or by an automatic system.

One important point to pay attention in the forming processes at elevated temperature is that the die temperature must be controlled within an optimal range. If the die components are at a lower temperature, they must be heated; if they are at a higher temperature, the excess heat is removed by a coolant (water, oil or air) pumped through the cooling channels made inside the die components or the coolant may be sprayed over the die surfaces and thus the die temperature is controlled with the designed range.

In complex sheet forming applications of automotive industry, die geometry often poses restrictions on the easy flow of metal from one region of the part to another, thus leaving relatively unstretched regions of the part bounded by heavily stretched areas. In such cases formability of the metal is poorly utilized due to the strain non-uniformity, and the propensity for fracture increases. This occurs because it is difficult to transmit stresses into certain regions of the sheet metal workpiece due to high frictional resistance or larger cross-sectional area in these regions. To enhance overall formability of the blank, some local area needs to be softened while some other critical areas needs to be maintained relatively harder by means of proper temperature gradient along the hot blank.

On the other hand if such an hot stamping and die quenching process also includes a hardenning process as described above (such as generating martenzitic structure for suitable steel blanks) some certain areas may be desired to be kept mild. In other words hardening operation may be desired to be achieved for certain areas of the blank. There may be other certain zones of the parts may be subjected to a subsequent cold forming operation such as blanking, punching, bending etc.

In FIG. 6 an further application area of the invention is shown to solve above problems. The present invention can be used to improve material flow with modified selective temperature gradient along the workpiece two dimensionally (along the surface) in order to enhance overall formability for hot stamping of such complex parts. The aim of this selective heating operation is to prevent local over stretching that resulting fractures or overthinning at certain critical areas (such as 49–50). This selective heating process is performed by means of interval cooling of these areas of the blank 44 during or after current heating by spraying pulvarized water with pressured air or pure air flow 45 toward those areas 46 for very short time cycles. Spray nozules 45 are placed around the blank and directed toward such critical areas such as 46 of the blank 44. Thereby during or after current heating of the blank, desired portions are cooled by spray pulses of directed nozules 45. At the stamping moment the blank sheet includes relatively cool/ certain areas in such critical portions surrounded by relatively hot and easily formable areas 47, 48. Modifying overall formability of the blank by generating relatively high and low strength areas depending on form of the part is very easy in a few seconds.

Figure 6A:
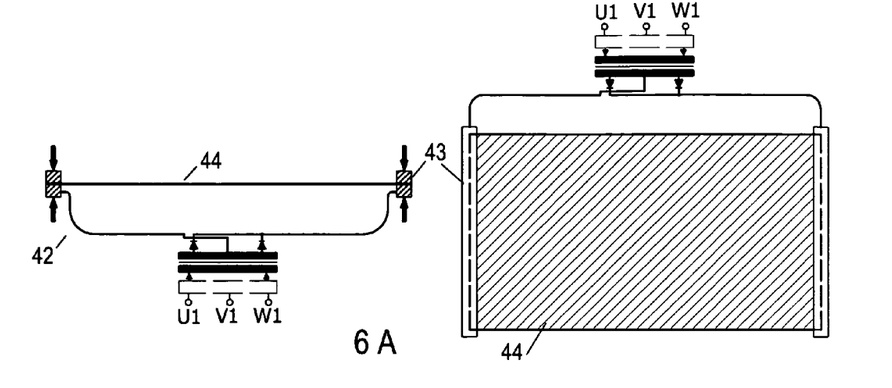
FIG. 6 illustrates current heating and selective spray cooling system providing desired temperature gradient along the blank for sheet forming process at elevated temperatures.
Figure 6B:
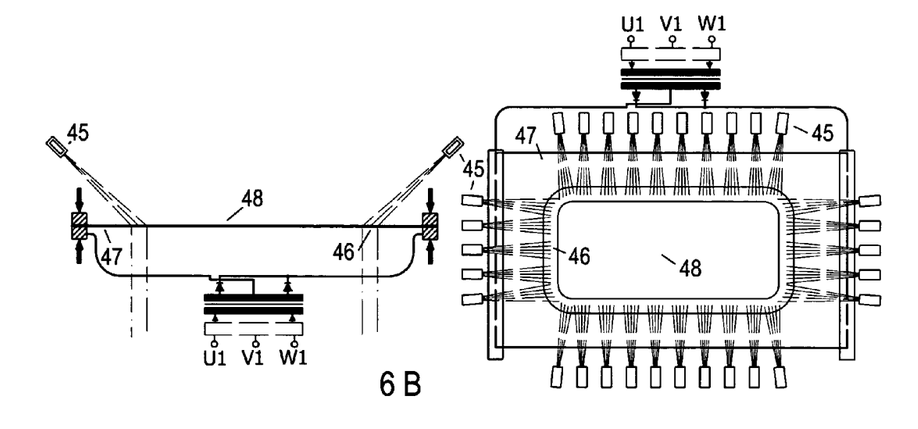
Figure 6C:
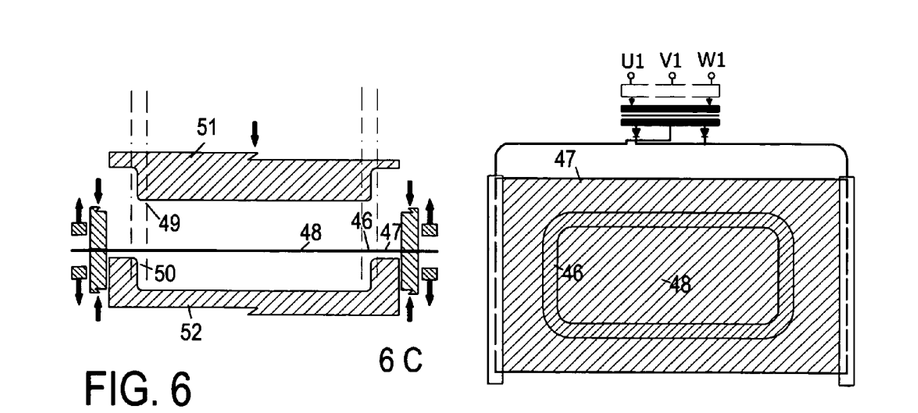

In selective heating process shown in FIG. 6A at the beginning whole workpiece 44 is homogeniously heated by application of high current rate connected 42, 43 from second coil of the transformer 1. Current rate and timing is controlled by control unit 2 situated on first coil of the transformer. At second stage as seen in FIG. 6B certain portions 46 of the blank which will involve severe strain rates are locally cooled by directed air jets 45. These areas 46 will be stretched between two sharp edges of two opposite dies. As seen in FIG. 6C at the stamping stage a desired temperature gradient and harder 46 and softer 47, 48 areas are obtained resulted by temperature gradient. These cooler and thus harder areas 46 will remain between two opposite edges 49, 50 of upper 51 and lower 52 dies. Thus a fairly important instrument is provided for determining which areas will be stretched more and which areas will be stretched less. At the stage of die desing, desired temperature gradient map is calculated using by proper simulation program.

Instead of stable nozules are shown in FIG. 6 movable nozules can be employed. These movable nozules can be approached toward these areas during interval cooling stage and narrow areas can be cooled more accurately. Movement of these nozules can be provided by pnomatic or hydraulic arrangement. Consequently any desired temperature and formability gradient along the blank sheet can be achieved in a few seconds. For example it was observed that yield strength of a steel alloy is approximately 2.5 times higher at 800 C than that of at 1000 C in our previous experiments.

For example a steel blank sheet to be hot formed can be heated to 950 C homogeniously and then temperature of some critical areas can be reduced to 750 C locally by means of above mentioned way, these critical portions such as sharp corners, edges etc. are prevented from being subjected of fractures or overthinning. Directions, spraying angles of spray nozules, air and water quantities to be sprayed and their pulse cycles are determined and adjusted depending on form of the part and other forming parameters.

Another important application area of the local cooling of certain portions of the hot blank sheet is to obtain certain soft (unhardened) portions at the end of the process. For example heat treatable (hardenable) steel sheets (boron alloyed hardenable sheets for automotive industry in practice) can only be hardened when it is heated up above austenite temperature and then be quenched between dies. If above mentioned local cooling process is applicated during current heating cycle (before these zones are heated up to the austenite temperature) and maximum temperature rates of such certain areas are kept below austenite temperature (between 850–900 C) these areas will remain mild (with ferritic and without martenzitic or dual phase structure) at the end of the process.

Thus last stage forming operations such as, bending, blanking, collar forming, punching etc. can be performed later for such certain areas.

Consequently maximum temperature of a certain portion of the workpiece made of hardenable steel should be reached above austenite temperature in order to obtain hard martenzitic structure at the end of the process. In other terms if certain zones of the blank are prevented to reach austenite temperature by means of local coolant spraying during current heating cycle, these zones will be remained as soft portions at the end of the process.

Both two different local cooling types can be applied in one production cycle. Determining key factors of these local cooling processes are:
1) If there are critical zones of the blank which will be subjected to local fracture and overthining, these zones should be cooled locally (by being sprayed coolant locally) after whole blank is heated up above austenite temperature limit. At the stamping moment these zones should be cooler considerably than that of general average temperature of the whole blank. In this case these critical areas will be slightly stretched during stamping and will also become hardened zones at the end of the process.
2) If there are certain zones of the blank which will be desired to be subjected to be cold forming operations after hot stamping cycle, these zones should be cooled by spraying etc, during heating stage with current and such zones should never be allowed to reach austenite temperature limit while the blank is generally being heated above austenite temperature limit.

These two local cooling types can be applicated in same hot stamping cycle. For example a heat treteable steel blank sheet will be heated by current application within 10 seconds and its general temperature will be reached up to 1000 C. Pressured air and/or coolant nozules are employed (during) at the 5. sec of current application while actual temperature of the blank is about 500 C. At the end of the heating period of 10 sec. general temperature of the blank is 1000 C and temperature of locally cooled areas is 750 C. But there are some other type critical zones of the blank to be subjected to overthining or fracture. These areas are cooled after austenite temperature is reached then their temperature is decreased to 700 C. Then the blank is stamped and compressed by dies for 3 seconds and quenched.

In this case three types of zones will occur at the end of the process:
1) Zones which were heated generally by current and were not involved any local cooling process: These zones are heavily stretched during stamping moment and became hardened areas at the end of the operation.
2) Zones which were heated by current and cooled locally during current heating: Since these zones is not heated up to austenite temperature limit these zones will remain as mild areas at the end of the process. Cold forming operations such as blanking, punching, bending etc. can be applicated on such zones after hot stamping
3) Zones which are heated by current and cooled locally after current heating: These zones will also be slightly stretched during stamping and became hardened areas at the end of the process.

What is claimed is:

1. Method for enhancing formability of a metallic workpiece (4) by means of electric current application to a workpiece to be formed by a subsequent forming operation at the elevated temperature by being compressed between a set of dies, the method characterised in that;

controlling magnitude and timing of electric current with an electronic control unit (2) feeding primary coil of at least one transformer (1) with primary (9)/secondary (10) coil ratio more than one, generating electric current at the second coil of said transformer(s) in a controlled manner, connecting said current to two electrode sets (5) contacting with two opposite sides of the forming area of said workpiece via two sets of the connections so that heat is generated inside said workpiece by transforming electric energy into heat energy until predetermined temperature at the workpiece is obtained, keeping temperature of the dies between a predetermined temperature range by taking away heat from the dies in a controlled manner, forming said workpiece between at least two dies by being compressed between said dies, achieving a predetermined heat transfer amount within a certain range from the workpiece to the dies while said workpiece is being compressed between dies, cooling of electrical connections (3) from said transformer to the workpiece including electrodes (5) contacting with said workpiece by means of cooling fluid flow, varying heat amount of taken away from the connectors and tools by variation of their actual temperature such that keeping their temperatures between their predetermined ranges.

2. A homopolar DC generator is employed instead of the transformer at the process as claimed in claim 1 as a source of current to be passed along the metallic workpiece (4) to heat up said workpiece in order to prepare subsequent mechanical forming operation which is controlled in synchronized manner with mechanical forming operation, characterized in that;

generating electric current by said homopolar generator in a controlled manner, connecting said current to two electrode sets (5) contacting with two opposite sides of the forming area of said workpiece via two sets of the connections (3) so that heat is generated inside said workpiece by transforming electric energy into heat energy until predetermined temperature at the workpiece is obtained, keeping temperature of the dies between a predetermined temperature range by cooling means being achieved by cooling fluid flow contacting with die masses in a controlled manner, forming said workpiece between at least two dies by being compressed between said dies, achieving a predetermined heat transfer amount within a certain range from the workpiece to the dies while said workpiece is being compressed between dies, cooling of electrical connections from said homopolar generator to the workpiece including electrodes contacting with said workpiece by means of cooling fluid flow, varying heat amount of taken away from the connectors and tools by variation of their actual temperature such that keeping their temperatures between a predetermined range.

3. Method according to claim 1 characterised in that;

converting three phase of mean (8) into one or two phase electric current, feeding primary circuit of said transformer(s) (1) with said one ore two phase current.

4. Method according to claim 1 characterised in that;

converting alternating current inducted at the secondary coil of the transformer (1) into direct current, applicating said direct current to said workpiece, reducing impedance of the last circuit including said workpiece (4) and its connections (3).

5. Method according to claim 1 characterised in that;

employing two or more transformers (1) featuring same characteristics as the current source of the process, collecting their secondary circuit currents, applicating their total current to the workpiece (4).

6. Method according to claim 1 characterised in that;

utilizing a tubular metallic part with closed section as the workpiece of the process, applicating internal pressure (12) inside the tubular metallic workpiece, heating said tubular metallic workpiece by current application via two sets of electrodes (21) being contacted with its two opposite edges, providing a proper temperature rate at the tubular workpiece within a predetermined range, forming the tubular workpiece between at least two die sets (14,15,16,18) by being compressed by at least one die, holding the tubular workpiece between die sets and internal pressure until a predetermined temperature is reached at the tubular workpiece so that sufficient dimensional stability is obtained, removing the formed tubular workpiece between the die sets.

7. Method according to claim 1 characterised in that;

measuring actual temperatures of the dies with temperature sensor(s), comparing with predetermined upper temperature limit whether temperature of the die(s) is higher than predetermined upper limit cooling the die(s) by spraying coolant (35) toward its surfaces or by the flow of cooling fluid being flowed in the passages placed inside the die bodies when die temperatures is above said upper limit.

8. Method according to claim 1 characterised in that, forming operation is performed in a machine which have ability to be operated with variable forming speeds by means of varying movement speed of at least one die against the workpiece during compression cycle.

9. Method according to claim 1 characterised in that, temperatures of transformer, connectors and clamp type electrodes are kept within a predetermined range by dissipating heat by a coolant flow.

10. Method according to claim 1 which is applicated in a multistage forming process performed in a series of forming stations in sequence in a progressive manner including forming, piercing and blanking stages and applicating interval heating process by means of current application between forming stages, the methot is characterized in that;

holding the metallic workpiece (25) in a billet or a blank form with two clamp type electrodes (24) contacting two opposite sides of the heating area, generating heat inside the forming portion of the workpiece by applicating current via two clamp type electrodes, placing the heated portion of the workpiece between two dies of the forming station, preforming the heated portion of the workpiece by being compressed between two dies, carrying the workpiece out of the forming machine, applicating current to generate heat inside the forming portion of the workpiece, placing the heated portion of the workpiece between two dies of the next forming station, repeating heating and forming cycles for each following forming station, finishing the completed part by piercing and blanking at the last station.

11. Method according to claim 1 characterised in that;

combining the heating means with handling means of the workpiece by employing carrier arms (31) with movable clamp type electrode sets (38,39) contacting with two opposite edges of the blank (37) as the holding tools and connecting current came from two ends of second coil of the transformer (1) to generate heat inside the blank during handling process, accelerating process cycles by heating up the workpiece by current application out of the press table while previously heated workpiece is being formed at the press table at the same time, preventing overheating at the carrier arms, connectors and electrodes by cooling means.

12. Method according to claim 1 characterised in that; the heat treatment process performed as increased cooling cycle after forming of the workpiece in a controlled manner after hot forming process by spraying a coolant fluid (35) toward workpiece surface (33) after the die (34) is moved back.

13. Method according to claim 1 characterised in that;

heating the workpiece equally through its surface by application of current fed by seconder coil of the transformer, cooling selected portions (46) of the workpiece surface by spraying coolant jets by directed nozules (45) toward these certain portions which are previously determined as critical areas subjected to potential fracture or overstraining areas depending on die forms, obtaining two dimensionally predetermined temperature gradient on the workpiece surface, strengthening such critical areas by providing selective strain stress characteristics gradient through the workpiece, forming of the workpiece by being compressed between two dies (51,52)

preventing fractures and overstraining at the such critical areas by increasing their strength, decreasing their strain rates and facilitating material flow from surrounding areas to these critical portions.

14. A method as claimed in claim 1 characterised in that clamp type electrodes (38,39) holding two opposite sides of the workpiece is closed before the current application and opened between current application and forming stages under control of central control unit.

15. A method as claimed in claim 1 characterised in that cleaning and lubricating die surfaces by spraying fluid between stamping cycles.

* * * * *